(12) United States Patent
Meadows

(10) Patent No.: US 7,441,187 B2
(45) Date of Patent: Oct. 21, 2008

(54) WEB TEMPLATE PROCESSING UTILIZING DYNAMIC RULES DEFINED BY DATA STRUCTURE LANGUAGE

(75) Inventor: Chad L. Meadows, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 11/014,291

(22) Filed: Dec. 16, 2004

(65) Prior Publication Data

US 2006/0143182 A1    Jun. 29, 2006

(51) Int. Cl.
*G06F 17/00* (2006.01)
(52) U.S. Cl. .................................................... 715/243
(58) Field of Classification Search ................ 715/517, 715/513, 234, 243, 244, 246
See application file for complete search history.

(56) References Cited

U.S. PATENT DOCUMENTS

| | | | | |
|---|---|---|---|---|
| 5,680,443 | A * | 10/1997 | Kasday et al. | 379/88.13 |
| 6,418,400 | B1 | 7/2002 | Webber | 703/22 |
| 6,789,252 | B1 * | 9/2004 | Burke et al. | 717/100 |
| 6,993,456 | B2 * | 1/2006 | Brooks et al. | 702/183 |
| 2001/0029499 | A1 | 10/2001 | Tuatini et al. | 706/47 |
| 2001/0034771 | A1 | 10/2001 | Hutsch et al. | 709/217 |
| 2002/0174085 | A1 | 11/2002 | Nelson et al. | 707/1 |
| 2002/0184065 | A1 | 12/2002 | Menard et al. | 705/7 |
| 2002/0198753 | A1 | 12/2002 | Feldman et al. | 705/7 |
| 2003/0050897 | A1 | 3/2003 | Altomare | 705/64 |
| 2003/0084377 | A1 | 5/2003 | Parks et al. | 714/38 |
| 2003/0110072 | A1 | 6/2003 | Delurgio et al. | 705/10 |
| 2003/0117437 | A1 | 6/2003 | Cook et al. | 345/764 |
| 2003/0145305 | A1 * | 7/2003 | Ruggier | 717/100 |
| 2007/0214449 | A1 * | 9/2007 | Choi et al. | 717/100 |

OTHER PUBLICATIONS

Parr, Enforcing Strict Model-View Separation in Template Engines, ACM 2004, pp. 224-233.*
Took, Surface Interaction: A Paradigm and Model for Separating Application and Interface, ACM 1990, pp. 35-42.*
McRoy et al., An Augmented Template-based Approach to Text Realization, Google 2003, pp. 381-420.*
Heller et al., "A flexible software architecture for presentation layers demonstrated on medical documentation with episodes and inclusion of topological report," (no pub. date available).
Starkey, M., "XML-Based Templates for Generating Artifacts from Java-Based Models," *Research Disclosure*, vol. 41, No. 416103, pp. 1678-1680, 1998.
Norrie et al., "From State to Structure: an XML Web Publishing Framework," (no pub. date available).
Chen, R., "Generic XML Generator from Java Hashtable," *Research Disclosure*, No. 440132, pp. 2180-2181 (2000).

* cited by examiner

*Primary Examiner*—Cong-Lac Huynh
(74) *Attorney, Agent, or Firm*—Saul Ewing LLP; John R. Pivnichny

(57) ABSTRACT

A system and method which utilizes an additional layer of control in a conventional Model View Controller model for web presentations. In particular, the new layer creates logical components of templates which can then be dynamically controlled by rule definitions inherent in the data structure. In this manner the resulting system can apply logic to the rendering of the template while significantly reducing the amount of logic required in the template itself or required to be defined in code. This allows templates to be developed which are easier to understand and modify as they typically contain far less non-HTML artifacts than traditional methods (e.g., Java Server Pages).

24 Claims, 9 Drawing Sheets

```
<table width="443" cellpadding="0" cellspacing="0" border="0">
<tr valign="top">
<td width="218">#render("/homepage/download vm")</td>
<td width="7"> </td>
<td width="218">#render("/homepage/troubleshoot vm")</td>
</tr>
</table>
<table width="443" cellpadding="0" cellspacing="0" border="0">
<tr valign="top">
<td width="218">#render("/homepage/learn vm")</td>
<td width="7"> </td>
</tr>
</table>
```

Template C Definition

| | | (target+) |
|---|---|---|
| e alias | @ name | leftNavTop |
| | e target | ((parameters?, match+) \| parameters)? |
| 402 | @ templateID | /leftnavigation/leftNavTopHomePage.vm |
| | x e condition | |
| | @ mapID | path |
| 404 | @ value | /homepage/homePage.vm |
| | e target | ((parameters?, match+) \| parameters)? |
| 406 | @ templateID | /leftnavigation/leftNavTop.vm |

Figure 6

WEB TEMPLATE PROCESSING UTILIZING DYNAMIC RULES DEFINED BY DATA STRUCTURE LANGUAGE

FIELD OF THE INVENTION

The present invention relates to developing and managing Web user interfaces (to include Web page presentations) using model-view-controller (MVC) design methodology. In particular, using a MVC paradigm, the invention reduces the problems associated with the development and management of a web presentation layer by introducing a new layer of control which utilizes augmented templates and rules inherent in certain types of structured data (e.g. XML language).

BACKGROUND OF THE INVENTION

In designing and maintaining Web page presentations, template engines are frequently employed that allow separation of the function of getting data from a database from the function of presenting this data. Model-View-Controller (MVC) methodology is a common prior art method of performing this separation. MVC relates the user interface to underlying data models. MVC comprises three main components or objects to be used in attaining this goal:
  A Model, which represent the underlying, logical structure of data in a software application and the high-level class associated with it. That is, the model represents enterprise data and the business rules that govern access to and updates of this data. This object model does not contain any information about the user interface.
  A View, which renders the contents of a Model. It accesses enterprise data through the Model and specifies how that data should be presented. Typically, it is a goal of the View component to maintain consistency in its presentation when the Model changes.
  A Controller, which translates interactions with the View into actions to be performed by the Model. The actions performed by the Model include activating business processes or changing the state of the Model. Based on the user interactions and the outcome of the Model actions, the Controller responds by selecting an appropriate view.

The separation of model and view allows multiple views to use the same enterprise model. An important consideration of any well designed MVC is to allow for improved efficiency of development and maintenance. Accordingly, such a well designed MVC system entails the ability to develop an application rapidly and maintain it at low cost by having utilized a design that is flexible enough for future improvement. At an abstract level, the separation of logic and presentation is certainly desirable as long as it meets this flexibility goal.

Typically MVC prior art systems utilize Java Server Pages (JSPs) to create the template. This template essentially describes how data should be visually presented. JSP is a technology for controlling the content or appearance of Web pages through the use of servlets, small programs that run on the Web server. In this manner, these servlets modify the Web page before it is sent to the user who requested it. Microsoft's Active Server Page (ASP) technology is comparable to JSP. Whereas a Java Server Page is a Java program that is executed by the Web server, an ASP contains a script that is interpreted by a script interpreter (e.g. VBScript or Jscript) before the page is sent to the user.

Various attempts have been made to implement XML (extensible Markup Language) and XSLT (extensible Stylesheet Language Transformations, which reformats XML data into a new document such as HTML) into template based engines for separating the presentation function. These prior art systems present a tradeoff in the difficult in development (exemplified by those using XSLT) and the difficulty in effecting subsequent changes.

The present invention overcomes these problems in the prior art by providing a more elegant solution to the problem of separation of the presentation and logic—in a manner that is more conducive to both initial development and subsequent changes.

SUMMARY OF THE INVENTION

The present invention comprises adding a View Controller component between the View component and the System Controller component of a typical MVC system. This View Controller component processes the templates of the View Component and creates its own augmented templates containing logical components. Further, The View Controller handles many common tasks of presentation layouts by incorporating dynamic rule definitions contained in the data (e.g., rule definitions in XML data).

In this manner the invention applies logic to the rendering of the augmented template without the need of embedding any of the logic in the template itself or needing to define the logic in code. In this process, run-time conditions determine which template(s) to use. This allows template structures to be developed which are very easy to understand and modify as they typically contain far less non-HTML artifacts than traditional JSP's.

With the present invention much of the logic of the view presentation is now contained in the View Controller, thereby permitting the View Layer to become much simpler and easier to maintain. In addition, less code is required in the System Controller. This results in the System Controller also being simpler and more maintainable.

BRIEF DESCRIPTION OF THE DRAWINGS

Various embodiments of the present invention will now be described in detail in conjunction with the annexed drawings, in which:

FIG. 3 illustrates an embodiment of the invention in which a template's definition includes a template syntax language;

FIG. 4 illustrates an example of template aliasing based on dynamic rules;

FIG. 6 illustrates rule based link management;

DETAILED DESCRIPTION

Figure 1:
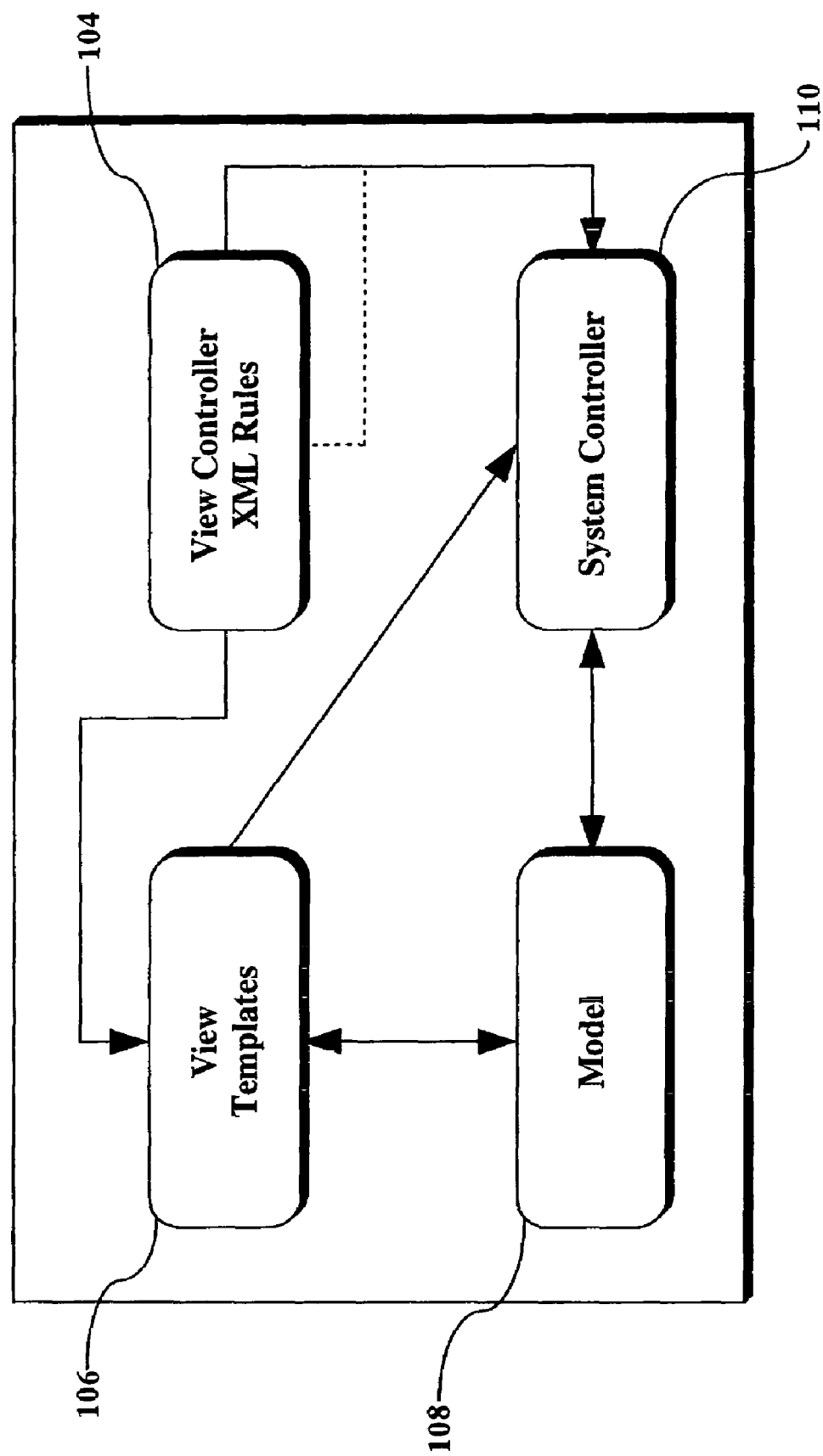
FIG. 1 shows the major components of a MVC architecture according to the method and system of the present invention.

FIG. 1 depicts an embodiment of the invention in which a View Controller 104 is added to a typical prior art MVC system, the latter consisting of a View layer 106, a model layer 108 and a system controller 110. In this embodiment, the view controller 104 processes templates and XML rules definitions. By incorporating the view controller 104 in this manner, the view layer 106 requires less logic. Accordingly, the view is simpler and easier to maintain. Further, this arrangement results in less code being required in the system controller 110. Consequently, the system controller 110 is also easier to maintain.

The view controller 104 permits very fine grained structured control of the view presentation. That is, it permits a greater level of control of the presentation detail. Typically, presentation details are a function of session state information. That is, as a unique user interacts with a Web application over a period of time ("session"), a collection of objects that are tied to the session are stored on a server. This collection of objects are referred to as the session state. As an example, a user seeking to obtain information about his bank account over the Internet would typically be required to first enter his account number, then a personal identification number (PIN number). Additional session state information might include various responses to questions posed by the system or may be obtained from a data base of the bank which contains personal information relating to that user. In this manner, the view presentation can be personalized to the user—e.g., wishing him a happy birthday when appropriate. The view controller 104 handles many common tasks of these presentation layouts and does so with increased flexiblitity by allowing dynamic rules to be defined against the session state.

Figure 2A:
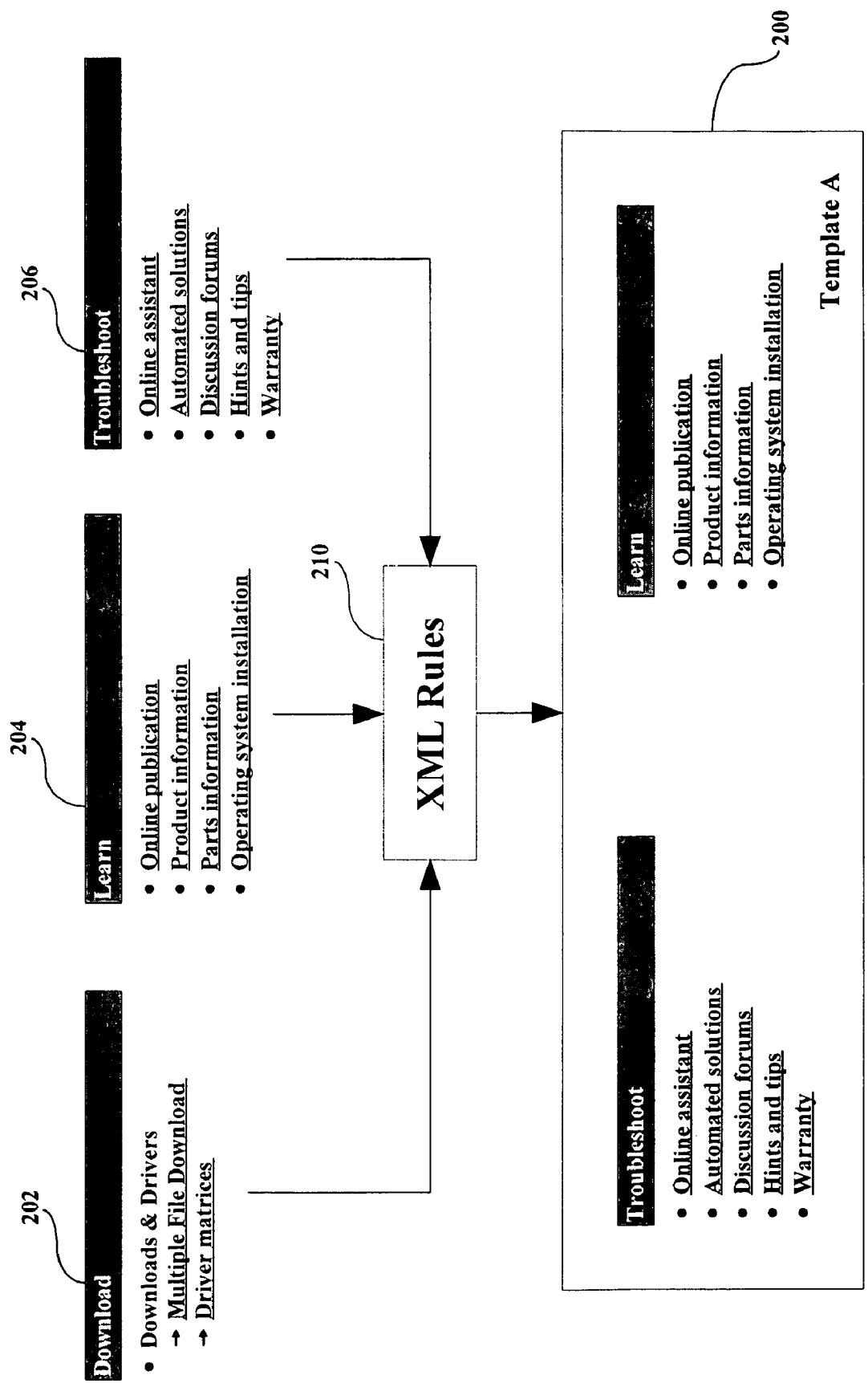
FIGS. 2A and 2B are process diagrams depicting selection of various sub-templates for inclusion into a larger augmented template.
Figure 2B:
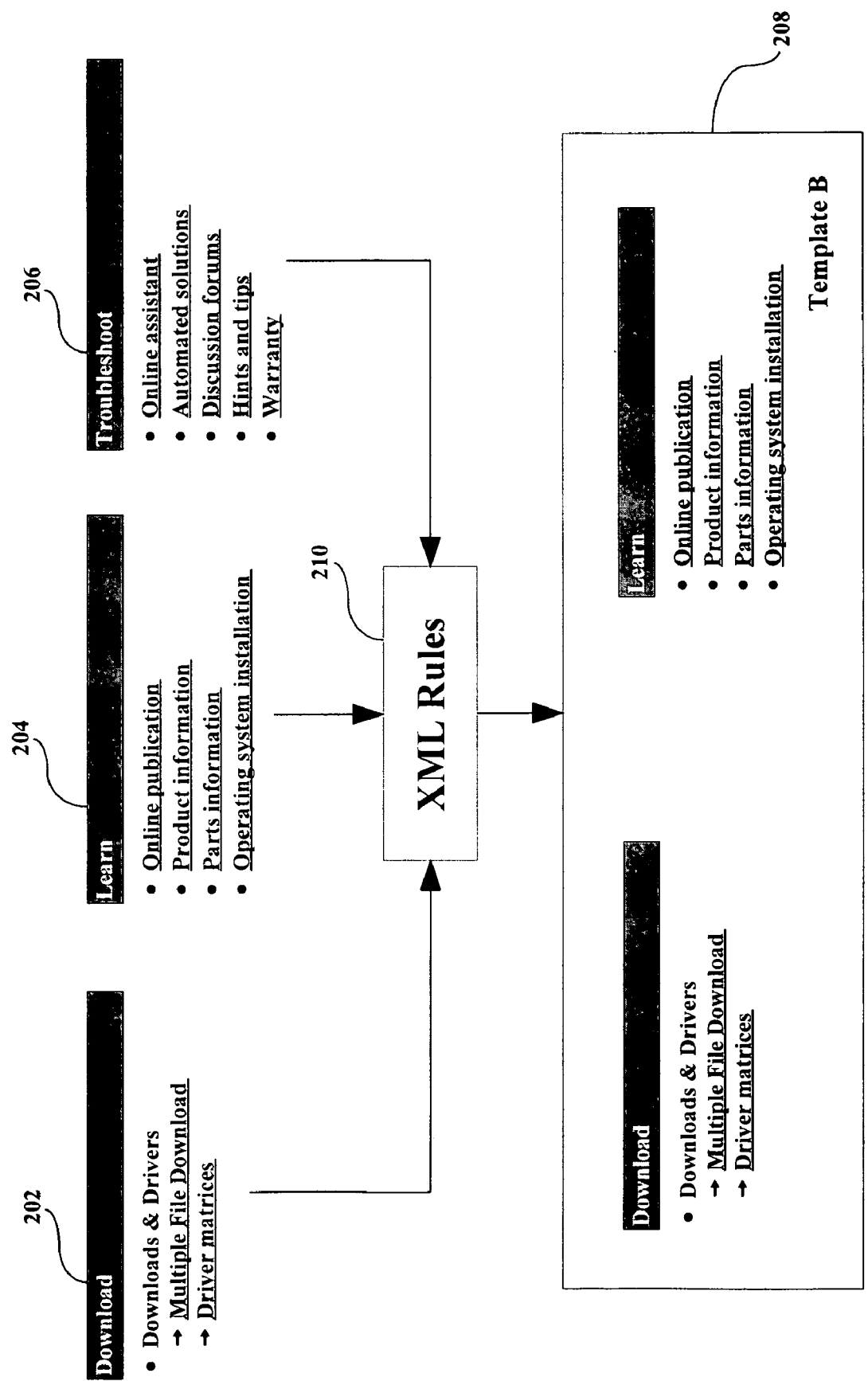

In this embodiment of the invention, augmented templates are dynamically assembled relying on the rules that exist in an XML file. FIGS. 2A and 2B depict examples of such template assemblies. As illustrated in FIG. 2A, three smaller templates, 202, 204 and 206 are assembled to form augmented Template A (item 200). An XML Rules Evaluator 210 is used as a control point during the assembly of Template A and determines which templates should be included. In the example illustrated by FIG. 2A, only templates 204 and 206 were incorporated into augmented Template A. In the way of comparison, FIG. 2B illustrates only templates 202 and 204 being selected for building an augmented Template B (item 208).

The present invention performs the creation of augmented templates (e.g., Template A, Template B) by a process more sophisticated than merely appending together smaller templates. In particular, the View Controller of the present invention dynamically assembles these templates according to defined rules that exist relating to the structure of the data. In the embodiment depicted in FIGS. 2A and 2B this dynamic assembly invokes the rule definitions present in the XML language.

FIG. 3 shows in greater detail how the assembly of an augmented Template C is implemented according to an embodiment of the present invention using XML rules. In particular, Template C is defined as having three control points (at lines labeled 302, 304, and 306) which, upon execution of this program language, allow for the sub templates to be assembled together into Template C. The three individual sub templates (corresponding to items 202, 204, and 206 of FIG. 2A) are parsed by a parsing engine and tokens are defined which become the control points on which the definitions of the XML rules operate.

By way of example, item 302 contains both conventional HTML language used in Web page design (<td width="218") as well as the following template language that is unique to the present invention:

render("/homepage/download vm")

In its operation, the invention would interpret this template syntax to essentially execute potentially complex operations and logic that is made available within the XML definition—without any such logic existing within the template file itself.

Thus, such entries within the template can be viewed as mere place holders which when acted upon by the invention's interpreter would yield a Web presentation text based format, such as SVG (Scaleable Vector Graphs) or HTML code. Such newly generated HTML code, when combined with the HTML code present in Template C, would then be presented to and treated by the View Template Component 106 in a conventional manner to create the presentation to the user.

Of significance is that in this embodiment of the invention, the actual HTML language appearing in Template C can be reduced in complexity. The complexity and logic are made available within the XML definitions without requiring their presence in the template. This is made possible because the augmented template indirectly references the XML definitions. Various examples of such definitions (i.e., defined within the XML rules) will now be discussed in greater detail.

1. Template Aliasing: Allows indirect template substitution based on dynamic rules. FIG. 4 illustrates this example in which one of two or more alternative elements is selected. The correct target element is chosen when the sub element condition evaluates true. Thus, in the data structure illustrated at 402, the target templateid becomes "leftnavigation/leftNavTopHomePage.vm" when the mapid equals the value specified ("/homepage/homepage.vm", at 404). Alternatively, at 406 the target templateid would be set to "/leftnavigation/leftNavTop.vm" should the mapid equal any other value.

An example of how this template aliasing would be used by the invention in a template definition follows:

```
<td width="150" class="dbg">
    #render ("leftNavTop")
</td>
```

The presence of this template syntax in this embodiment of the invention results in the logic of the appropriate leftNavTop becoming the selected target using the XML rules.

Figure 5:
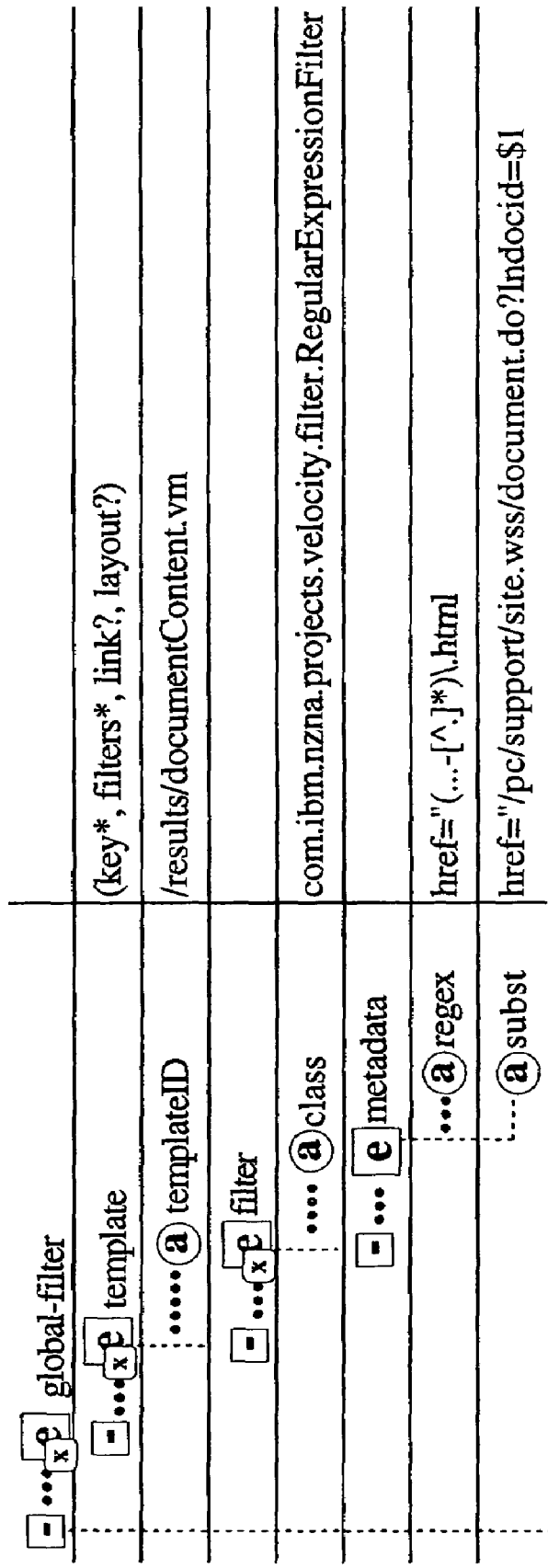
FIG. 5 illustrates an example of the use of metadata assignments based on dynamic rules.

2. Filtering: In-line dynamic template filtering can be applied at any level in the page rendering process by attaching a filter to a template.

a. Dynamic Filtering Plug-ins: The filters are based on a plug-in model allowing filters to be dynamically loaded. A metadata element allows dynamic passing of any parameters to the plugin.

b. Regular Expression Filtering: A regular expression filter is provided which provides very powerful dynamic custom filtering without the need of writing any custom filters.

c. Filter Chaining: Filters can be applied in any order to the rendering of a template. FIG. 5 illustrates an example of a chaining filter process as envisioned by the present invention.

3. Dynamic Metadata: a generic metadata model allows metadata assignments to templates and link elements which may contain dynamic constructs from the application context.

a. Template metadata can be assigned globally or per template.

b. Metadata is available directly in templates which allows for more readable templates.

c. Metadata is also rules based for link elements which allows for link attributes to be dynamically assigned and evaluated against the context.

d. The generic metadata model is easily expandable to other elements.

e. Metadata values can by dynamically assigned through introspection of session context.

An Example of the use of dynamic metadata is illustrated below:

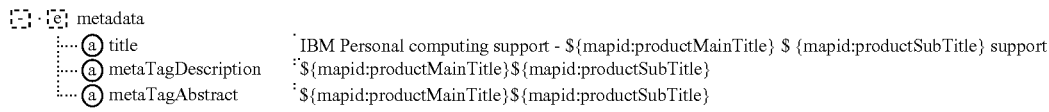

In this example metadata values are mapped directly into a Java Map object. The ${ } notation is dynamically substituted for values in the session using introspection.

4. Rule Based Target Elements: the rule based target model allows for much of the dynamic features of the present invention
   a. Targets can be assigned conditions which are evaluated against the application context.
   b. Aliases, Links and Layouts currently use the target condition model.
   c. The model is easily expanded to any other element. For instance, rule based filtering could be easily implemented.

5. Rule Based Link Management: links are managed and defined in the XML rules definitions.
   a. Dynamic Link Targets: the link URL can be dynamically assigned by target rule definitions.
   b. Link target, parameters and metadata can be defined in the XML rules.

Figure 6:
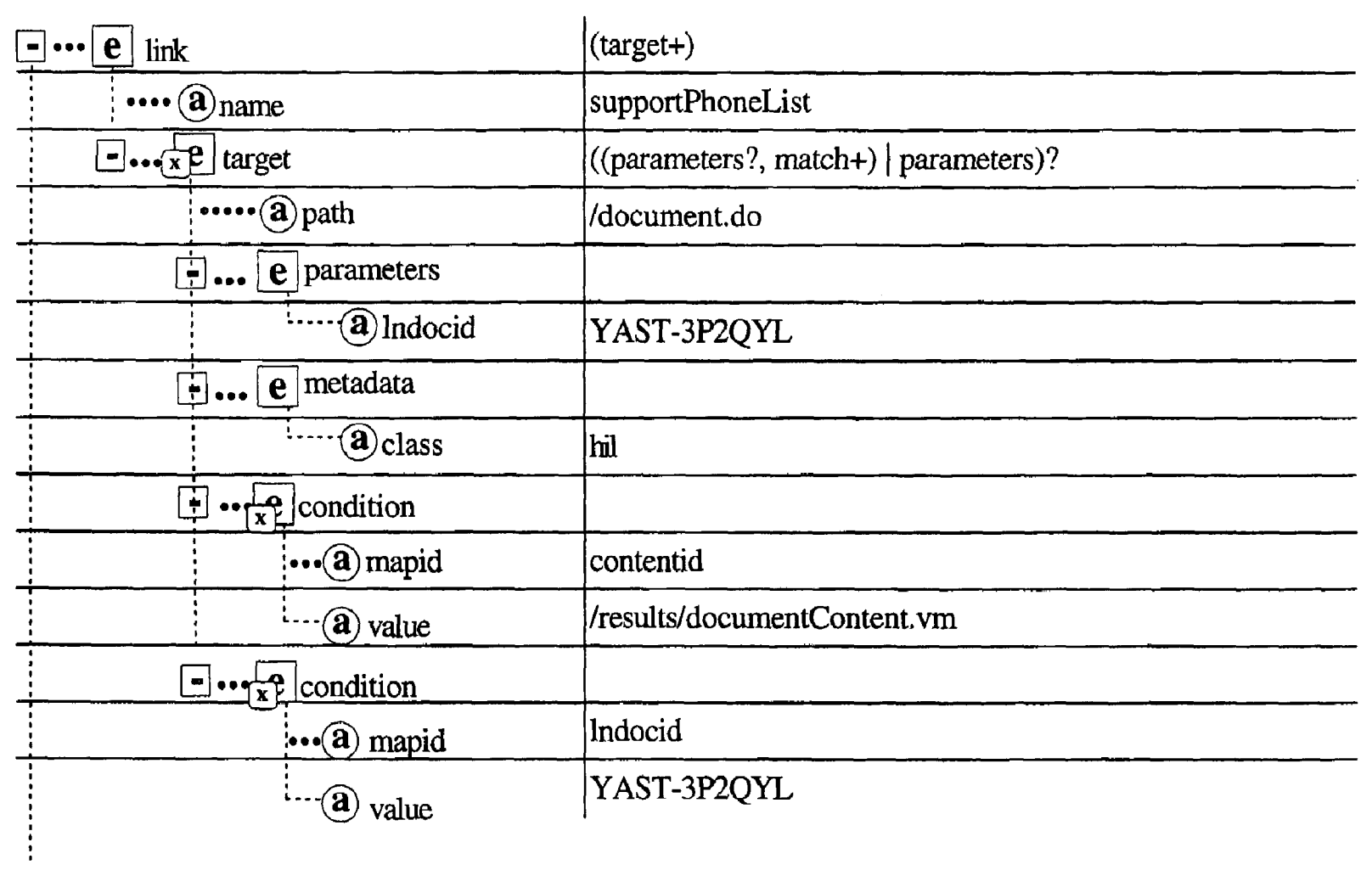

FIG. 6 illustrates an example of rule based linking in which dynamic, external links are being defined.

6. Global Layouts and Skins: Site wide layouts make it easy to handle site navigation and standard headers and footers.
   a. A layout is used to provide the most common elements around a screen. Typically, a layout includes header, footer, and navigation elements. Layouts support rule based selection whereby the layout is permitted to dynamically change on any rules against the application context.
   b. Layouts can define skins which are a set of templates defining the presentation look and feel.
   c. Common Template Set: common template sets allow template themes to be shared for different skins or layouts. Thus, a model can be structured in a hiearchy such that specific site themes or skins need only to define the templates which differ from the common set.
   d. Skin selection is based on the layout.

Figure 7:
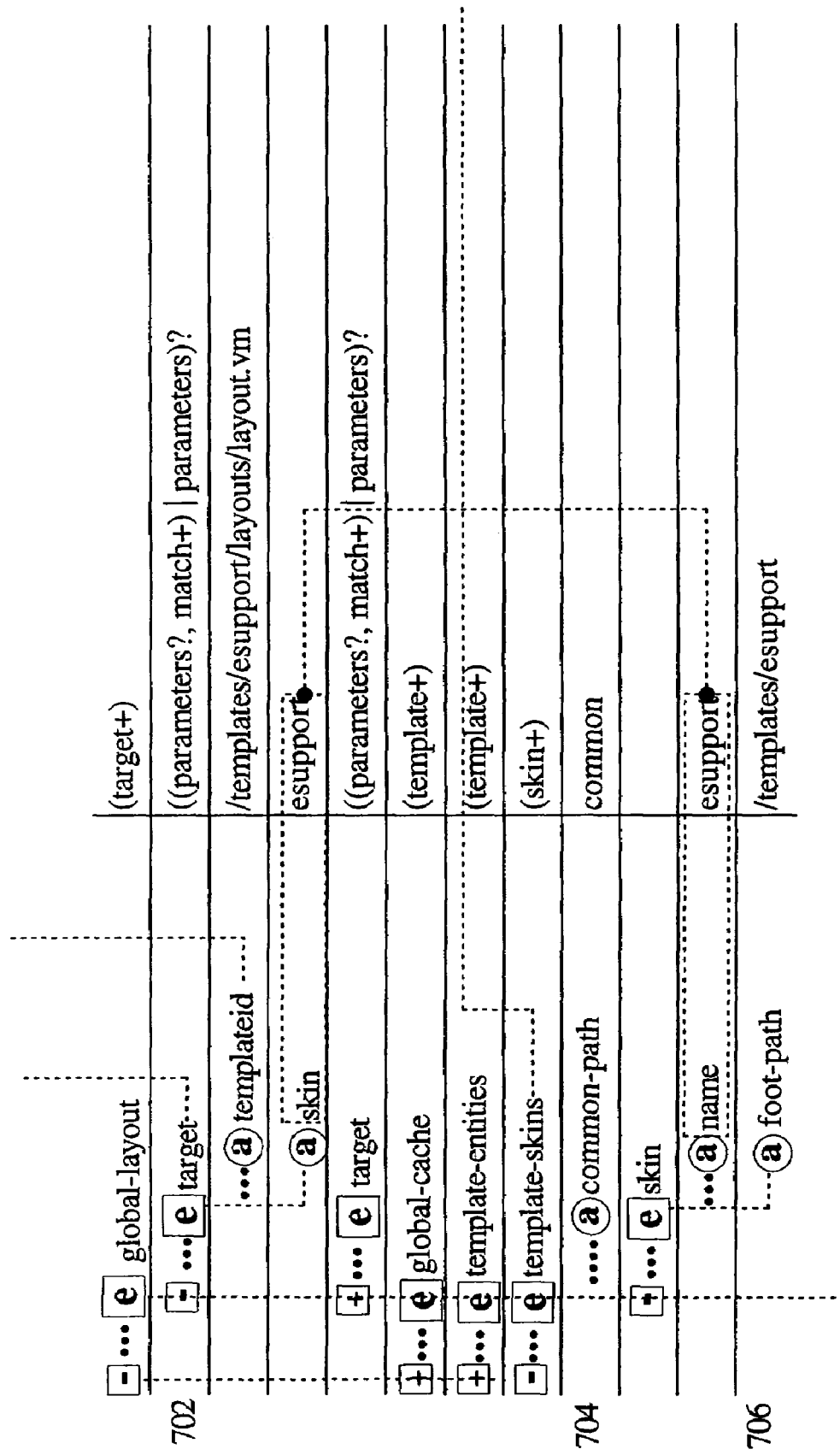
FIG. 7 illustrates an example of selecting skins based on dynamic rules.

FIG. 7 illustrates an embodiment of the invention in which a layout is selected. In particular, a layout is determined by the target element 702 which evaluates true by the match element. If there is no match element, it is the default target. In this illustrated example, item 704 denotes the common-path which defines a directory set which all skins share. This allows for some reuse among common theme sets. Item 706 depicts the path location for the skin. Changing the entire site theme is readily achieved by simply changing the path location to point to a different template set.

7. Dynamic Cache: cache definitions can be assigned by XML rules allowing efficient caching of most templates without the need to develop your own cache mechanism.
   a. Fine Grained: cache is defined per template, allowing precise control over what is cached.
   b. Dynamic Context Handles: the cache handle can be dynamically assigned through XML definitions, allowing the cache to operate on and expire against session data.
   c. Precise Expiration: cache model allows fine control over expiration through an Application Program Interface (API) as well as a dynamically available chronological (cron) expiration giving precise timing of when a cache expires.

An Example of the use of a dynamic Cache is listed below:

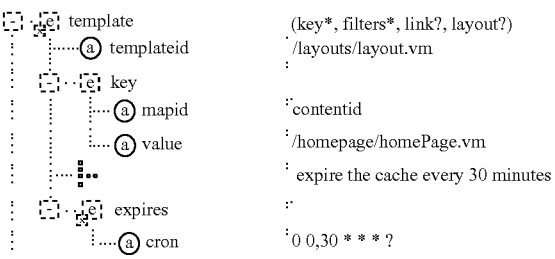

8. Context Mappings: context mappings provide the dynamic association for all the XML rules to application context.
   a. Dynamic Session Context: the context mappings allow you to define data which is available to the XML rule evaluators.
   b. Introspection Lookups: using introspection, the mappings allow dynamic definitions in XML to any object information in the session context.

An Example of the use of a dynamic session context mapping is listed below in which a value is obtained using the "$request" instruction. This value is subsequently used as the servername.

9. Realtime Configuration Updates:
   a. No Web Application Server (WAS) restarts or servlet reloading: all configuration can by updated in realtime while the application is running and serving clients. This includes XML definition rules, system configuration options and the presentation templates.
   b. Cron style update timer: a cron compatible update timer defined in properties configures the frequency the system checks for configuration updates.
   c. Development Mode Live Updates: system can be configured to update all configuration for each request. This allows developers to change or modify XML rules, templates, macros, or configuration while the system is running and view the results without any restarts of any system.

10. Exception Handling and Redirects:

a. Specify alternative templates to render per template in the event of generated exceptions.

An Example of the use of this feature is listed below:

| template | (key*, filters*, link?, layout?) |
| templateid | /homepage/homePage.vm |
| metadata | |
| error | |
| templateid | /message/standardErrorPage.vm | b. Fail Safe redirect policy to a configurable static page for critical errors.

Figure 8:
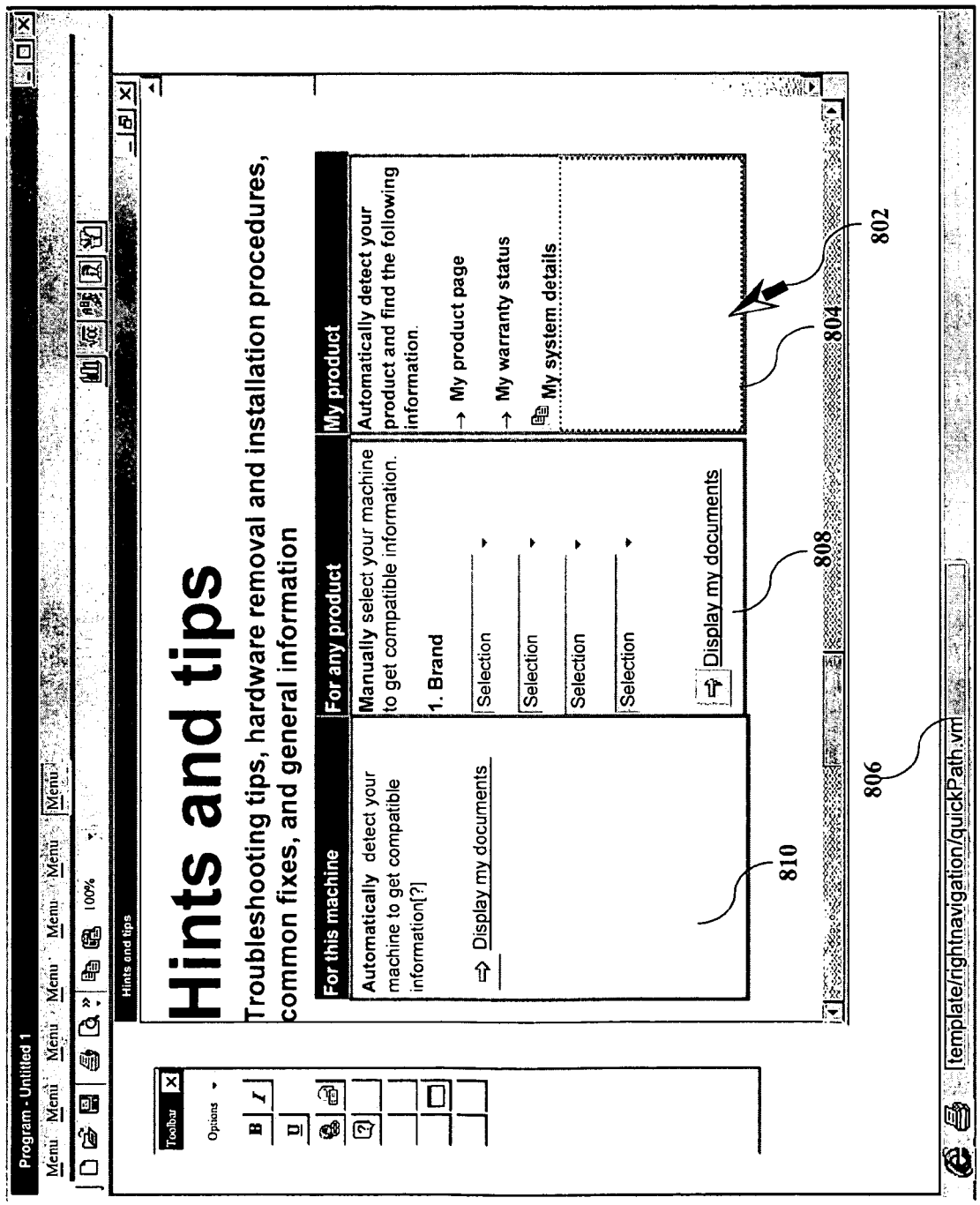
FIG. 8 illustrates a feature of the present invention which displays the name of the template associated with a selected section of the page presentation.

An additional embodiment of the invention provides a useful tool to the individual(s) responsible for developing and managing the Web page presentations. In particular, this tool presents to the individual the template that yielded a selected section of the displayed Web page. FIG. 8 is a screen shot of a Web page that illustrates this feature of the invention. When the user places his mouse cursor 802 over a region 804 of the page, the specific template that generated that region 804 is displayed in the page's status bar 806. As a result, the user readily knows what template needs to be modified to produce any desired changes in the displayed page.

This feature is particularly useful with other embodiments of the invention in which an augmented template is being generated by combining templates and which augmented template uses rules inherent in structure data to produce the web presentation. That is, the templates which are included in the augmented template are distinguished and visually identified to the user.

In a further embodiment of the invention JavaScript is utilized to create this feature. An HTML <div> tag is employed which surrounds each template included in the augmented template. Thus, by way of example an HTML <div> tag would surround template 202 of FIG. 2A. The <div> tag contains the JavaScript which makes that portion of the augmented template visibly highlighted when the mouse cursor is moved over that area. The JavaScript also enables displaying the name of the included template on the browser's status bar 806.

Listed below is an example of a JavaScript <div> tag which surrounds an included template:

```
<div onmouseover = "this.style.borderColor = 'blue';
this.style.borderStyle = 'solid'; window.status =
'template: $aliasname';
event.cancelBubble=true;"
onmouseout = "this.style.borderColor = 'red';
this.style.borderStyle = 'dashed'; window.status = ' ';
event.cancelBubble=true;"
style = "border: 1px dashed red;">
#parse($template)
</div>
```

The resulting visual effect produced by this code would be that each section of the presented page that is produced by a template so tagged would be presented surrounded by a dashed red line. In the non-color example presented in FIG. 8, these are depicted as sections simply surrounded by black dotted lines (e.g., 808 and 810). When the user moves this mouse cursor over one of these sections, the surrounding lines become solid blue lines indicating the selected area. In the FIG. 8 illustration, section 804 has been so selected wherein the resulting solid lines are illustrated absent the blue color. Moreover, the selection of section 804 results in the name of the template being displayed in the Status bar. As noted above, displaying in this manner the names of templates being used on the presentation page provides a useful tool for a developer or editor to modify the presentation.

While the invention has been described with reference to the preferred embodiment thereof, it will be appreciated by those of ordinary skill in the art that modifications can be made to the structure and elements of the invention without departing from the spirit and scope of the invention as a whole.

What is claimed is:

1. A method for developing and managing Web user interfaces (WUI) using a Model View Controller (MVC) paradigm, said paradigm comprising a model component containing data, a view component containing templates, and a system controller component, said method comprising the steps of:

adding an additional layer to the MVC paradigm, said layer comprising a view controller component;

processing one or more templates of the view component by said view controller component to create one or more augmented templates, at least one of which augmented templates contains at least one logical component;

defining control points contained in said augmented templates at which control points rule definitions operate which are contained in at least some of the data; and, rendering a page presentation utilizing said augmented templates and by incorporating the rule definitions contained in at least some of the data.

2. The method of claim 1 wherein said rule definitions further comprise dynamic rule definitions.

3. The method of claim 2 wherein said rule definitions comprise XML rule definitions.

4. The method of claim 3 wherein said rule definitions are selected from the group consisting of template aliasing, filtering, dynamic metada, rule based target elements, rule based link management, global layouts, global skins, dynamic caches, context mappings, real-time configuration updating, exception handling and exception redirecting.

5. The method of claim 2 wherein said rendering step comprises the step of utilizing session state data to determine at least some of said dynamic rule definitions.

6. The method of claim 2 wherein said augmented template comprises a template syntax and said rendering step further comprises the step of interpreting the template syntax to yield a Web presentation text based format.

7. The method of claim 1 further comprising the step of identifying to a user the template used in generating a section of said page presentation when said section is selected by the user.

8. A system for developing and managing Web user interfaces (WUI) using a Model View Controller (MVC) paradigm, said paradigm comprising a model component containing data, a view component containing templates, and a system controller component, said system comprising:

a memory;

means for adding an additional layer to the MVC paradigm, said layer comprising a view controller component;

means for processing one or more templates of the view component by said view controller component to create one or more augmented templates, at least one of which augmented templates containing at least one logical component;

means for defining control points contained in said augmented templates at which control points rule definitions operate which are contained in at least some of the data; and, means for rendering a page presentation utilizing said augmented templates and by incorporating the rule definitions contained in at least some of the data.

9. The system of claim 8 wherein said rule definitions further comprise dynamic rule definitions.

10. The system of claim 9 wherein said rule definitions comprise XML rule definitions.

11. The system of claim 10 wherein said rule definitions are selected from the group consisting of template aliasing, filtering, dynamic metada, rule based target elements, rule based link management, global layouts, global skins, dynamic caches, context mappings, real-time configuration updating, exception handling and exception redirecting.

12. The system of claim 9 wherein said means for rendering comprises means for utilizing session state data to determine at least some of said dynamic rule definitions.

13. The system of claim 9 wherein said augmented template comprises a template syntax and said means for rendering further comprises means for interpreting the template syntax to yield a Web presentation text based format.

14. The system of claim 8 further comprising means for identifying to a user the template used in generating a section of said page presentation when said section is selected by the user.

15. A computer program product for developing and managing Web user interfaces (WUI) using a Model View Controller (MVC) paradigm, said paradigm comprising a model component containing data, a view component containing templates, and a system controller component, said computer program product comprising:

a computer readable storage medium having computer readable program code means embodied in said medium, said computer readable program code means comprising:

computer readable program code means for adding an additional layer to the MVC paradigm, said layer comprising a view controller component;

computer readable program code means for processing one or more templates of the view component by said view controller component to create one or more augmented templates, at least one of which augmented templates containing at least one logical component;

computer readable program code means for defining control points contained in said augmented templates at which control points rule definitions operate which are contained in at least some of the data; and, computer readable program code means for rendering a page presentation utilizing said augmented templates and by incorporating the rule definitions contained in at least some of the data.

16. The computer program product of claim 15 wherein said rule definitions further comprise dynamic rule definitions.

17. The computer program product of claim 16 wherein said rule definitions comprise XML rule definitions.

18. The computer program product of claim 17 wherein said rule definitions are selected from the group consisting of template aliasing, filtering, dynamic metada, rule based target elements, rule based link management, global layouts, global skins, dynamic caches, context mappings, real-time configuration updating, exception handling and exception redirecting.

19. The computer program product of claim 16 wherein said computer readable program code means for rendering comprises computer readable program code means for utilizing session state data to determine at least some of said dynamic rule definitions.

20. The computer program product of claim 16 wherein said augmented template comprises a template syntax and said computer readable program code means for rendering further comprises computer readable program code means for interpreting the template syntax to yield a Web presentation text based format.

21. The computer program product of claim 15 further comprising computer readable program code means for identifying to a user the template used in generating a section of said page presentation when said section is selected by the user.

22. A method for developing and managing Web user interfaces (WUI) using a Model View Controller (MVC) paradigm, said paradigm comprising a model component containing data, a view component containing templates, and a system controller component, said method comprising the steps of:

creating one or more augmented templates based on one or more templates contained in said view component;

defining control points contained in said augmented templates at which control points rule definitions operate which are contained in at least some of the data;

rendering a page presentation utilizing said augmented templates; and, identifying to a user the augmented template used in generating a section of said page presentation when said section is selected by the user.

23. A system for developing and managing Web user interfaces (WUI) using a Model View Controller (MVC) paradigm, said paradigm comprising a model component containing data, a view component containing templates, and a system controller component, said system comprising:

a memory;

means for creating one or more augmented templates based on one or more templates contained in said view component;

means for defining control points contained in said augmented templates at which control points rule definitions operate which are contained in at least some of the data;

means for rendering a page presentation utilizing said augmented templates; and, means for identifying to a user the augmented template used in generating a section of said page presentation when said section is selected by the user.

24. A computer program product for developing and managing Web user interfaces (WUI) using a Model View Controller (MVC) paradigm, said paradigm comprising a model component containing data, a view component containing templates, and a system controller component, said computer program product comprising:

a computer readable storage medium having computer readable program code means embodied in said medium, said computer readable program code means comprising:

computer readable program code means for creating one or more augmented templates based on one or more templates contained in said view component;

a computer readable storage medium having computer readable program code means embodied in said medium, said computer readable program code means comprising: computer readable program code for defining control points contained in said augmented templates at which control points rule definitions operate which are contained in at least some of the data;

a computer readable storage medium having computer readable program code means embodied in said medium, said computer readable program code means comprising:

computer readable program code means for rendering a page presentation utilizing said augmented templates; and, computer readable program code means for identifying to a user the augmented template used in generating a section of said page presentation when said section is selected by the user.

\* \* \* \* \*